United States Patent
Nasu et al.

(10) Patent No.: US 8,355,508 B2
(45) Date of Patent: Jan. 15, 2013

(54) INFORMATION PROCESSING APPARATUS, INFORMATION PROCESSING METHOD, AND COMPUTER READABLE RECORDING MEDIUM

(75) Inventors: Masami Nasu, Kanagawa (JP); Jun Satoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 415 days.

(21) Appl. No.: 12/366,961

(22) Filed: Feb. 6, 2009

(65) Prior Publication Data

US 2009/0217040 A1    Aug. 27, 2009

(30) Foreign Application Priority Data

Feb. 12, 2008    (JP) .................................. 2008-030930

(51) Int. Cl.
*H04L 29/06*    (2006.01)
(52) U.S. Cl. ........ 380/281; 380/277; 380/278; 380/279; 380/284; 713/155; 713/156; 713/168; 713/171
(58) Field of Classification Search .................... 380/280
See application file for complete search history.

(56) References Cited

U.S. PATENT DOCUMENTS

| | | | | |
|---|---|---|---|---|
| 5,339,403 | A * | 8/1994 | Parker | 711/221 |
| 6,668,323 | B1 * | 12/2003 | Challener et al. | 713/183 |
| 2005/0223415 | A1 * | 10/2005 | Oho et al. | 726/27 |
| 2005/0262553 | A1 * | 11/2005 | Bialick et al. | 726/10 |

FOREIGN PATENT DOCUMENTS

JP    2004-320715    11/2004

OTHER PUBLICATIONS

Computer translation of JP 2004-320715, published Nov. 11, 2004.*

* cited by examiner

*Primary Examiner* — Jung Kim
*Assistant Examiner* — Adrian Stoica
(74) *Attorney, Agent, or Firm* — Oblon, Spivak, McClelland, Maier & Neustadt, L.L.P.

(57) ABSTRACT

An information processing apparatus for collecting apparatus data from an apparatus connected through a network and sending the apparatus data to a server connected through the network includes a recording unit storing a secret key and a public key certificate which are encrypted by key data and commonly distributed; an obtaining unit for obtaining, from the information processing apparatus, individual identification data by which the information processing apparatus can be uniquely identified, sending a request to provide the predetermined key data through the network to the server by specifying the individual identification data, and receiving the key data encrypted by the individual identification data from the server; and a decoder for obtaining the individual identification data from the information processing apparatus, decoding the key data by using the individual identification data, and decoding the common public key certificate and the secret key by using the decoded key data.

9 Claims, 12 Drawing Sheets

INFORMATION PROCESSING APPARATUS, INFORMATION PROCESSING METHOD, AND COMPUTER READABLE RECORDING MEDIUM

BACKGROUND OF THE INVENTION

1. Field of the Invention

The present invention generally relates to an information processing apparatus, an information processing method, and a computer readable recording medium, and more specifically to an information processing apparatus, an information processing method, and a computer readable recording medium which collect apparatus data of an apparatus connected through a network and send the apparatus data to a server apparatus connected through the network.

2. Description of the Related Art

Conventionally, there has been a system (referred to as "remote monitoring system", hereinafter) to monitor an image forming apparatus such as a copier, a printer, or a multifunction peripheral set in an office and the like through the Internet by a vendor who is in charge of a maintenance operation, such as the manufacturer of the image forming apparatus. The remote monitoring system is generally formed of an apparatus on a user's side (apparatus data collecting apparatus) for collecting apparatus data from the image forming apparatus, a server apparatus provided on a maintenance person's side, and the like. The apparatus data collecting apparatus transfers the apparatus data through the Internet to the server apparatus. Further, there is another mode in which the image forming apparatus directly transfers the apparatus data to the server apparatus.

Here, the apparatus data, which may be used for billing or include user's personal data or confidential data, are required to be transferred by secure communication. To prevent falsification, spoofing, and the like of the data on the data sending path, mutual authentication and cryptographic communication by SSL (Secure Socket Layer) are performed between a client (the apparatus data collecting apparatus or image forming apparatus) and the server apparatus.

To perform the mutual authentication, the client and the server apparatus are both required to have a secret key. The secret key includes data which cannot be leaked to protect the security of the remote monitoring system. Moreover, it is required that the secret key can be disclosed only to a client authorized by the maintenance person.

In the conventional remote monitoring system, a unique public key certificate and a secret key have been set in each apparatus which is used as a client, when the apparatus is shipped from the factory. That is, for an image forming apparatus as a client, and the apparatus data collecting apparatus as well, an embedded apparatus, in which a unique public key certificate and a secret key are embedded in advance, has been used instead of a general computer such as a PC (Personal Computer).

Therefore, when shipped from the factory, the secret key and the like are required to be recorded in the client so that they cannot be physically removed. In this manner, uniqueness and safety of the secret key have been secured.

[Patent Document 1] Japanese Patent Application Publication No. 2004-320715

However, a system lacks flexibility if an apparatus functioning as the apparatus data collecting apparatus is limited to the embedded apparatus. In view of this, it is preferable to achieve a function related to the apparatus data collecting apparatus by software that can be installed in a general purpose computer such as a PC (Personal Computer).

When the software is packaged to be distributed through the Internet or stored in a recording medium such as a CD-ROM to be distributed, the package is formed by copying. Therefore, it is difficult to safely introduce a secret key and the like, which are unique to each package, in a PC in which the software is installed.

Moreover, when the package is distributed through a network, it becomes possible to obtain the package relatively easily even by a malicious person. Therefore, the likelihood of an attack on the server apparatus by using the software may be increased.

SUMMARY OF THE INVENTION

The present invention is made in light of the above-described circumstances and it is an object of at least one embodiment of the present invention to provide an information processing apparatus, an information processing method, and a computer readable recording medium which can appropriately ensure the security of a remote monitoring system for an apparatus.

According to one aspect of the present invention, an information processing apparatus for collecting apparatus data from an apparatus connected through a network and sending the apparatus data to a server apparatus connected through the network includes a recording unit storing a first secret key and a first public key certificate which are encrypted by predetermined key data and commonly distributed; a key data obtaining unit for obtaining, from the information processing apparatus, individual identification data by which the information processing apparatus can be uniquely identified, sending a provision request to provide the predetermined key data through the network to the server apparatus by specifying the individual identification data, and receiving the predetermined key data encrypted by the individual identification data from the server apparatus; and a decoding unit for obtaining the individual identification data from the information processing apparatus, decoding the predetermined key data by using the individual identification data, and decoding the first public key certificate and the first secret key by using the decoded key data.

According to another aspect of the present invention, an information processing method executed by an information processing apparatus which collects apparatus data from an apparatus connected through a network and sends the apparatus data to a server apparatus connected through the network, includes a key data obtaining step of obtaining individual identification data, by which the information processing apparatus can be uniquely identified, from the information processing apparatus, sending a provision request to provide predetermined key data through the network to the server apparatus by specifying the individual identification data, and receiving the predetermined key data which is encrypted by the individual identification data from the server apparatus; and a decoding step of obtaining the individual identification data from the information processing apparatus, decoding the predetermined key data by using the individual identification data, and decoding a first public key certificate and a first secret key, which are commonly distributed and stored in a recording unit, by using the decoded key data.

According to another aspect of the present invention, a computer readable recording medium recoded with a computer program for causing a computer to collect apparatus data from an apparatus connected through a network and send the apparatus data to a server apparatus connected to the network is provided. The computer program includes a key data obtaining code for obtaining individual identification data, by which the computer can be uniquely identified, from the computer, sending a provision request to provide predetermined key data through the network to the server apparatus by specifying the individual identification data, and receiving the predetermined key data which is encrypted by the individual identification data from the server apparatus; and a decoding code for obtaining the individual identification data from the computer, decoding the predetermined key data by using the individual identification data, and decoding a first public key certificate and a first secret key, which are commonly distributed and stored in a recording unit, by using the decoded key data.

DETAILED DESCRIPTION OF THE PREFERRED EMBODIMENTS

Figure 1:
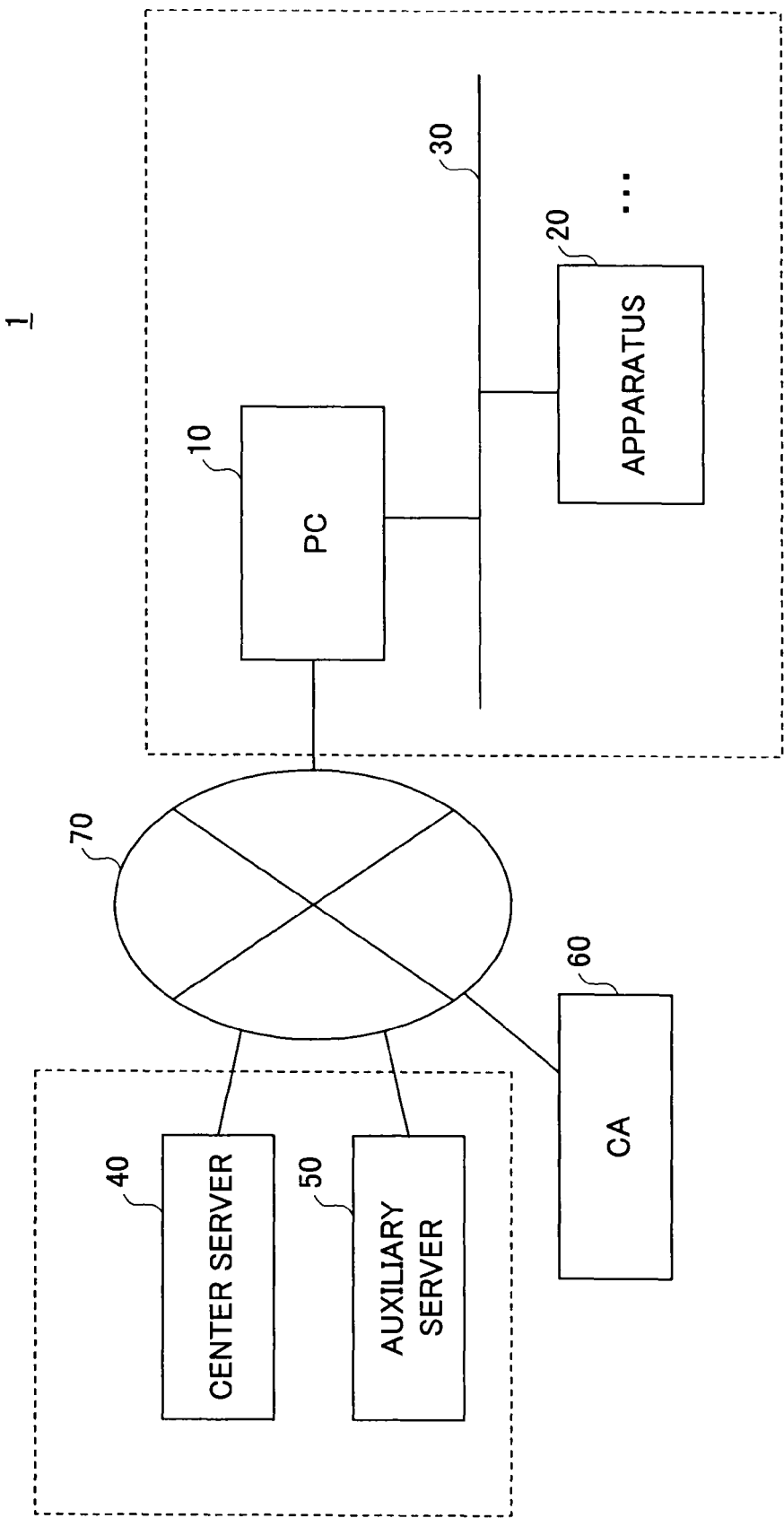
FIG. 1 is a diagram showing a configuration example of an apparatus monitoring system of an embodiment of the present invention.

Next, an embodiment of the present invention is described with reference to the drawings. FIG. 1 is a diagram showing a configuration example of an apparatus monitoring system of the embodiment of the present invention. In FIG. 1, an apparatus monitoring system 1 includes a PC 10, one or more apparatuses 20, a center server 40, an auxiliary server 50, a CA (Certificate Authority) 60, and the like. The PC 10 and the apparatus 20 are connected through a network 30 (in a wired or wireless manner) such as a LAN (Local Area Network). Further, the PC 10, the center server 40, the auxiliary server 50, and the CA 60 are connected through a network 70 such as the Internet.

The PC 10 and the apparatus 20 are provided in a user site of the apparatus 20 (such as an office where the apparatus 20 is set). The apparatus 20 is an image forming apparatus such as a copier, a printer, a facsimile machine, or a multifunction peripheral, which is monitored by the apparatus monitoring system 1. The PC 10 collects data to be monitored from the apparatus 20 (data indicating various counter values, an operating state, and the like, which are hereinafter called "apparatus data") and transfers the apparatus data to the center server 40 by cryptographic communication (for example, SSL (Secure Socket Layer) communication). Note that there are plural user sites. Therefore, there are plural PCs 10 as well.

The center server 40 and the auxiliary server 50 belong to a monitoring site of the apparatus 20 (for example, the vendor of a maintenance service of the apparatus 20, such as the manufacturer of the apparatus 20). The center server 40 receives the apparatus data from the PC 10 and accumulates them when the apparatus monitoring system 1 is in a normal operation. The auxiliary server 50 performs a process to ensure security of communication and the like conducted from the PC 10 to the center server 40. More specifically, the auxiliary server 50 performs a process to introduce a secret key, a public key certificate, and the like which are unique to each PC 10, into the PC 10. The secret key, the public key certificate, and the like are used for mutual authentication and cryptographic communications between the PC 10 and the center server 40.

The CA 60 is one or more computers serving as a so-called certificate authority, which issues the public key certificate, and the like.

Figure 2:
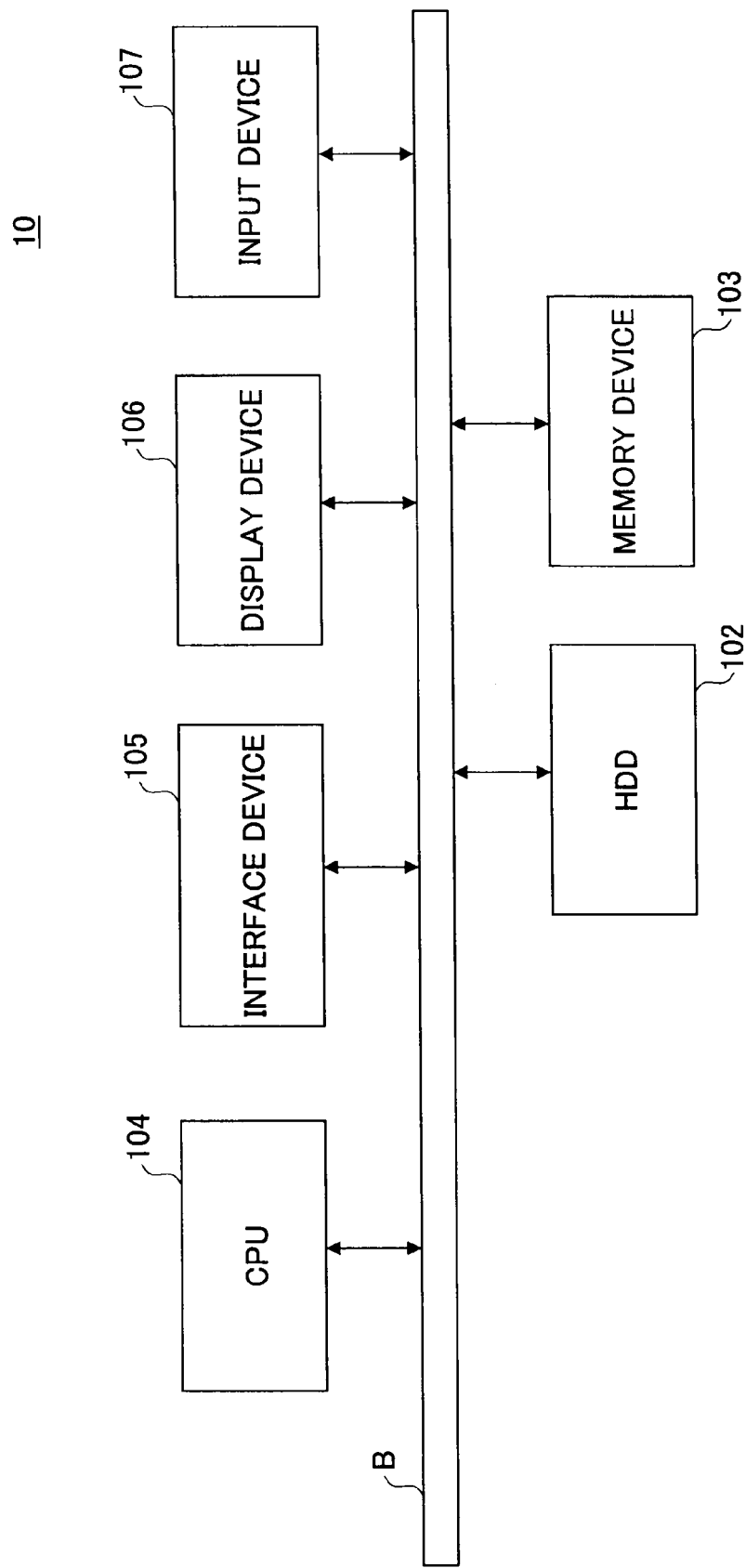
FIG. 2 is a diagram showing a hardware configuration example of a PC of an embodiment of the present invention.

FIG. 2 is a diagram showing a hardware configuration example of a PC of an embodiment of the present invention. The PC 10 is configured to include an HDD 102, a memory device 103, a CPU 104, an interface device 105, a display device 106, and an input device 107, which are mutually connected through a bus B.

A program (apparatus data notification program) to realize a process in the PC 10 is, for example, downloaded through the network and installed in the HDD 102. The HDD 102 stores the installed apparatus data notification program and other required files, data, and the like.

The memory device 103 reads out and stores the apparatus data notification program from the HDD 102 and stores it when there is an instruction to activate the apparatus data notification program. The CPU 104 realizes a function related to the PC 10 according to the apparatus data notification program stored in the memory device 103. The interface device 105 is used as an interface for connection to the network. The display device 106 displays a GUI (Graphical User Interface) and the like by the apparatus data notification program. The input device 107 is formed of a keyboard, a mouse, and the like, and used to input various operating instructions.

Note that the apparatus data notification program is not necessarily installed through the network. For example, the apparatus data notification program may be installed by using a recording medium such as a CD-ROM or an SD card.

Figure 3:
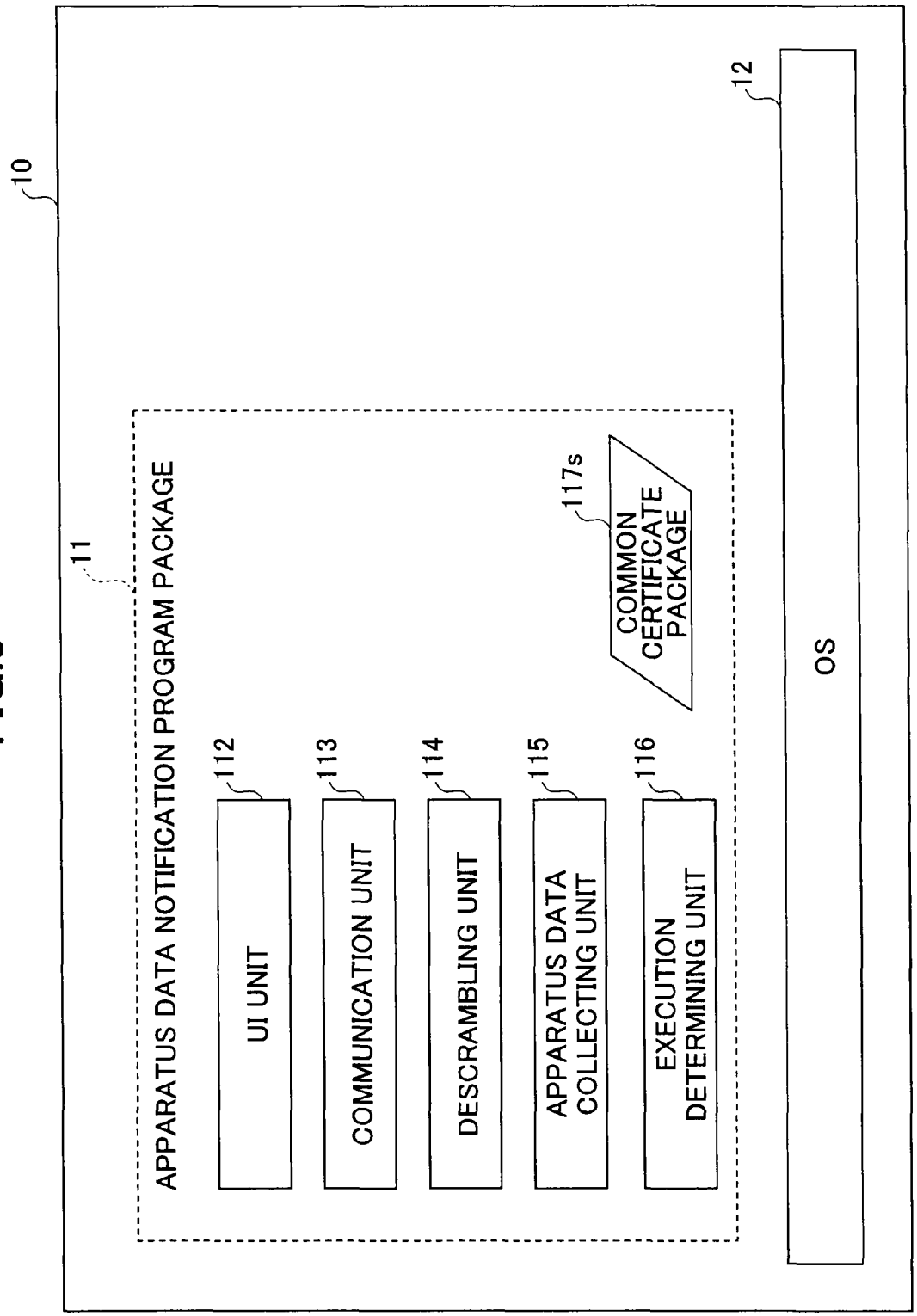
FIG. 3 is a diagram showing a configuration example of functions of a PC right after an apparatus data notification program is installed.

FIG. 3 is a diagram showing a configuration example of functions of the PC right after the apparatus data notification program is installed. As shown in FIG. 3, an apparatus data notification program package 11 includes a UI unit 112, a communication unit 113, a descrambling unit 114, an apparatus data collecting unit 115, an execution determining unit 116, a common certificate package 117s, and the like. Among these units, the UI unit 112, the communication unit 113, the descrambling unit 114, the apparatus data collecting unit 115, and the execution determining unit 116 operate on an OS 12.

The UI unit 112 makes the display device 106 display the GUI, detects user's requests, and provides data to the user. The communication unit 113 communicates with the center server 40 and the auxiliary server 50. The descrambling unit 114 descrambles the common certificate package 117s. That is, the common certificate package 117s in a scrambled (encrypted) state is included in the apparatus data notification program package 11. Therefore, after being installed, the common certificate package 117s is stored scrambled in the HDD 102. The apparatus data collecting unit 115 collects apparatus data from the apparatus 20 connected to the network 30. The execution determining unit 116 determines whether the apparatus data notification program may be executed, when a service (apparatus monitoring service) by the apparatus data monitoring system 1 is used.

The common certificate package 117s is a package of an electronic certificate based on PKCS (Public Key Cryptography Standards), which is required for cryptographic communication (SSL communication) with the auxiliary server 50. As described above, however, the common certificate package 117s is stored scrambled in an initial state. Therefore, the cryptographic communication with the auxiliary server 50 cannot be performed as it is. When the cryptographic communication with the auxiliary server 50 cannot be performed, a certificate package (referred to as "individual certificate package", hereinafter) which is unique to each PC 10 and required for the cryptographic communication with the center server 40 cannot be obtained. Thus, the apparatus monitoring service cannot be used. The center server 40 does not accept the apparatus data transferred from the PC 10 without a valid individual certificate package. Therefore, a user who wants to use the apparatus monitoring service signs a predetermined contract (referred to as "apparatus monitoring contract", hereinafter) with the monitoring site. By signing the apparatus monitoring contract, the user can obtain key data (referred to as "common key", hereinafter) for descrambling the common certificate package 117s. Note that the apparatus data notification program package 117s is merely a copy of a master package. Therefore, the common certificate package 117s included in the apparatus data notification program package 11 distributed to each user site is a common package as implied by the name, and is not different among the distributed apparatus data notification program packages 11. Therefore, a common key that scrambles the common certificate package 117s is common among the apparatus data notification program packages 11.

Figure 4:
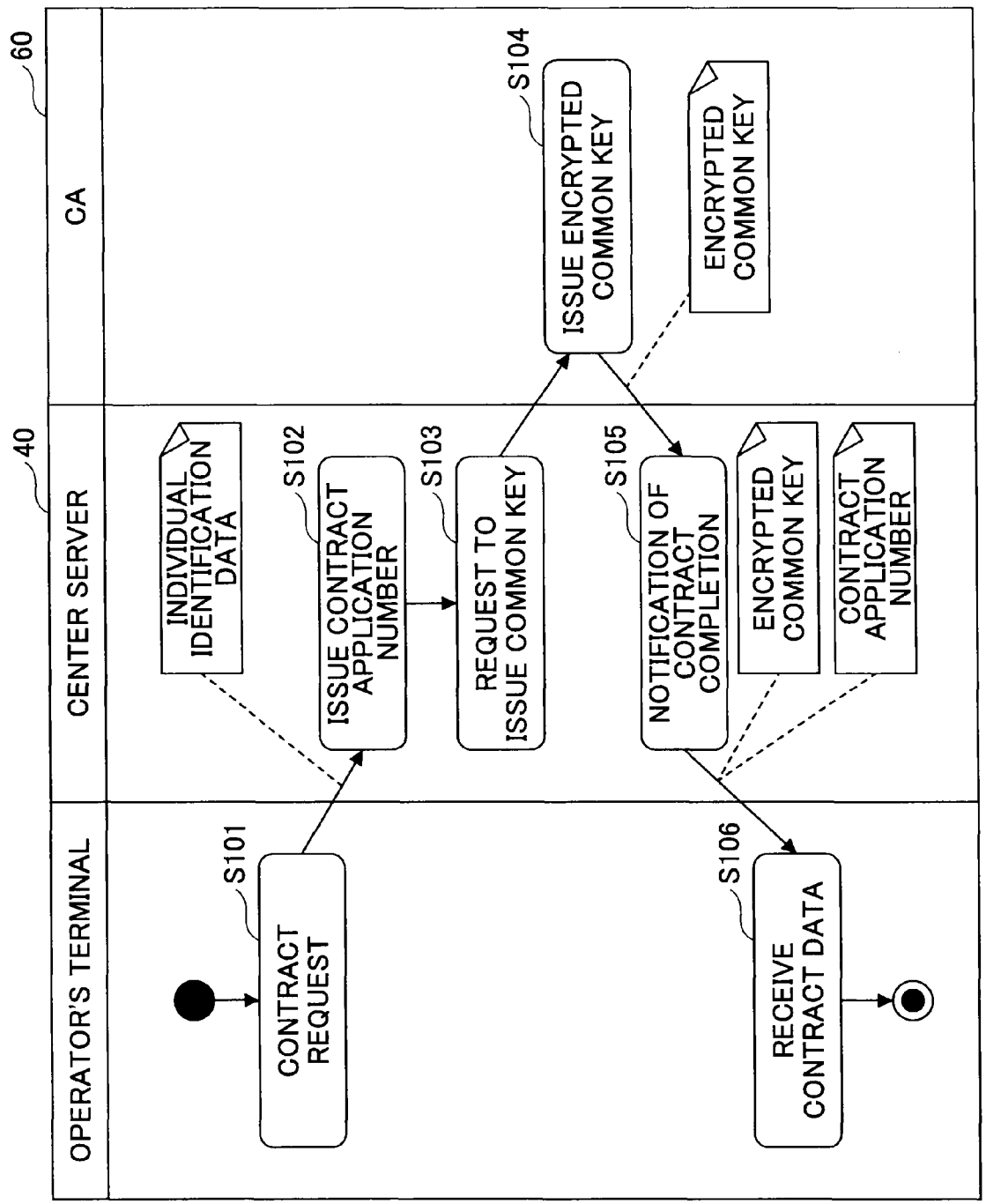
FIG. 4 is a diagram for describing a process order of signing an apparatus monitoring contract.

FIG. 4 is a diagram for describing a process order of signing the apparatus monitoring contract. In FIG. 4, an operator's terminal may be the PC 10, another PC (Personal Computer) which can be connected to the Internet, and the like.

For example, when a user inputs data by which the PC 10 can be uniquely identified (referred to as "individual identification data", hereinafter) as a required item in a contract request page (virtual contract) displayed on a Web browser of the operator's terminal and presses a "send" button, the operator's terminal sends an apparatus monitoring contract request with the inputted individual identification data to the center server 40 (S101). As the individual identification data, for example, a MAC address may be used.

The center server 40 issues (generates) a contract application number, which is unique to each contract, by receiving the apparatus monitoring contract request (S102). Subsequently, the center server 40 sends an issue request of a common key with the individual identification data to the CA 60 (S103). For example, the CA 60 encrypts (reversible transformation) the common key, which is stored in advance, by the individual identification data, and returns the encrypted common key to the center server 40 (S104). Here, the encrypted common key is encrypted by the individual identification data. Therefore, the encrypted common key is unique to each PC 10.

Subsequently, the center server 40 returns the encrypted common key and the contract application number to the operator's terminal with a contract completion notification (S105). The operator's terminal receives the encrypted common key and the contract application number and stores them in a recording device. Note that the contract application number may be displayed on the display device.

As described above, the user can obtain the encrypted common key (common key) for descrambling the common certificate package 117s. Next, descrambling (decoding) of the common certificate package 117s is performed. When the operator's terminal used for the contract is different from the PC 10, the encrypted common key is required to be stored in the HDD 102 of the PC 10 prior to descrambling.

Figure 5:
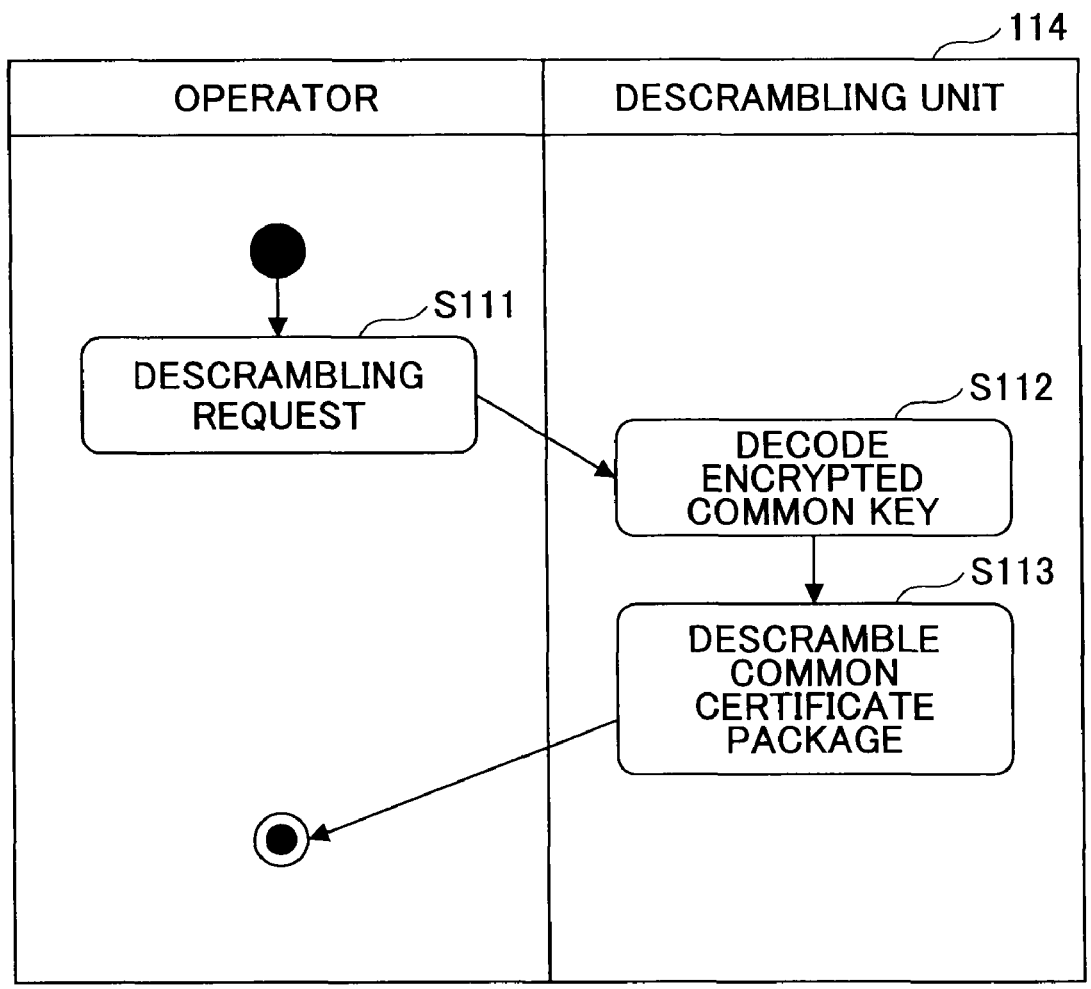
FIG. 5 is a diagram for describing a descrambling process of a common certificate package.

FIG. 5 is a diagram for describing a descrambling process of the common certificate package.

When a user inputs a descrambling instruction of the common certificate package 117s through a display that the UI unit 112 of the PC 10 displays on the display device 106 (S111), the descrambling unit 113 obtains the individual identification data from the PC 10 and decodes the encrypted common key by the individual identification data (S112). Here, since the individual identification data are unique to each PC 10, decoding of the encrypted common key can only be performed with success in the PC 10 related to the individual identification data specified in the contract. Therefore, by distributing the common key which is encrypted by the individual identification data, decoding of the encrypted common key is prevented in the PC 10 which is not under contract.

Subsequently, the descrambling unit 113 descrambles the common certificate package 117s by the decoded common key, and stores a descrambled common certificate package 117 in the HDD 102. As a result, data included in the common certificate package 117 can be used.

Figure 6:
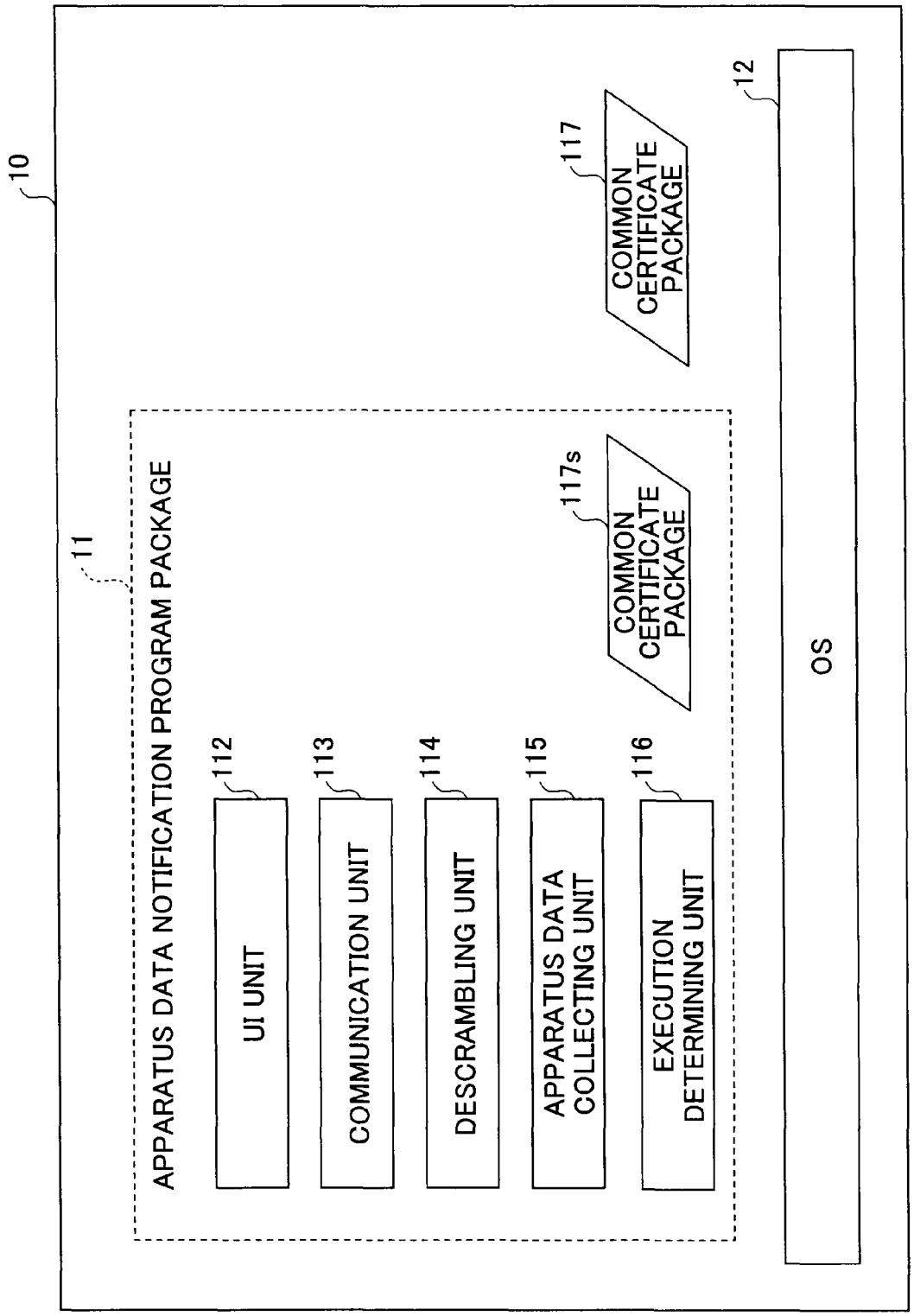
FIG. 6 is a diagram showing a configuration example of functions of a PC after the common certificate package is descrambled.

FIG. 6 is a diagram showing a configuration example of functions of the PC after the common certificate package is descrambled. In FIG. 6, since the common certificate package 117s is decoded, the common certificate package 117 is included as a new component.

Figure 7:
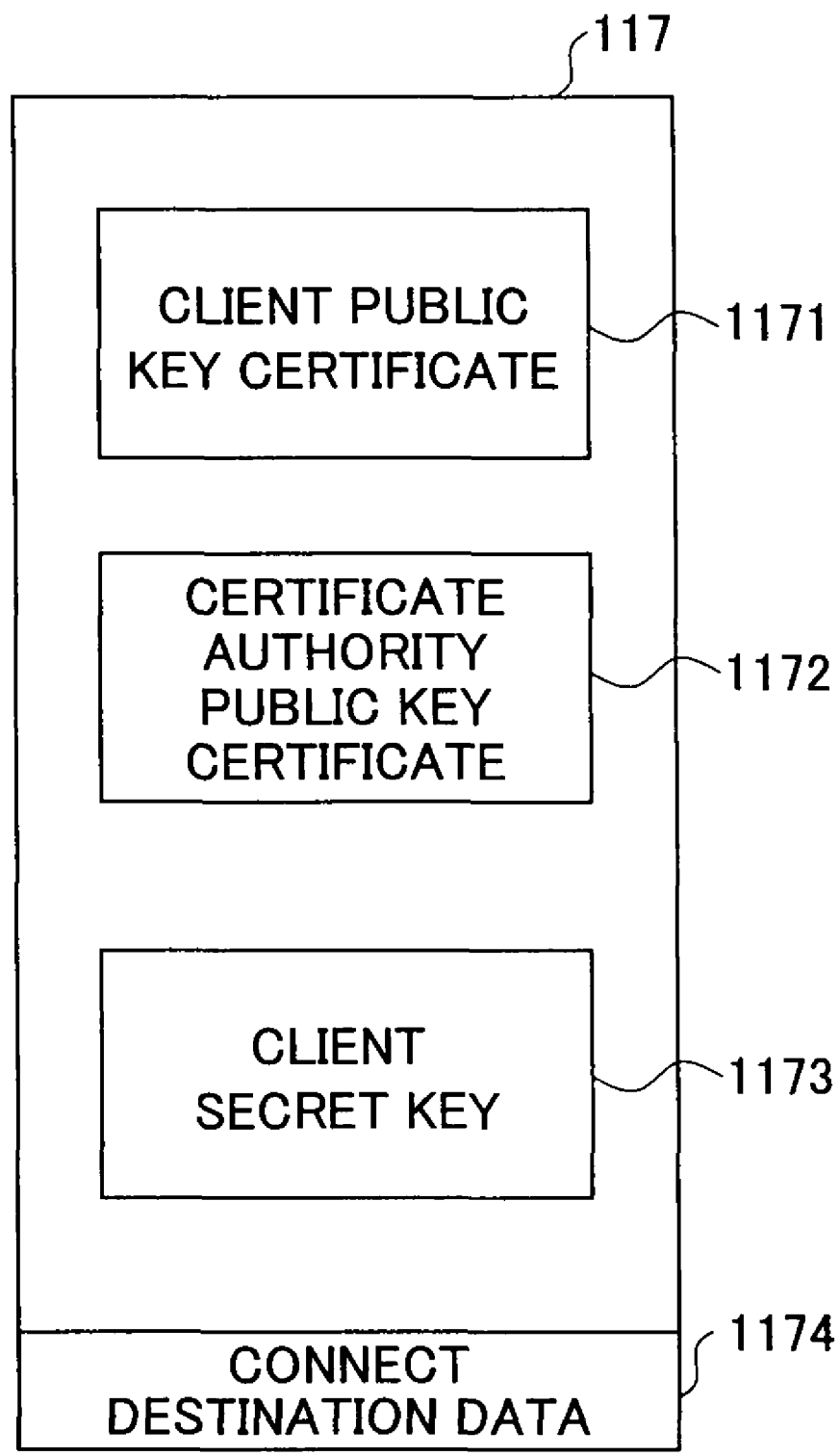
FIG. 7 is a diagram showing a configuration example of the common certificate package.

FIG. 7 is a diagram showing a configuration example of the common certificate package. As shown in FIG. 7, the common certificate package 117 includes a client public key certificate 1171, a certificate authority public key certificate 1172, a client secret key 1173, connect destination data 1174, and the like. The client public key certificate 1171 and the client secret key 1173 are used as a public key certificate and a secret key, respectively, of the PC 10 side in the cryptographic communication with the auxiliary server 50. The certificate authority public key certificate 1172 is a public key certificate of the CA 60. The connect destination data are identification data of a destination of the connection by cryptographic communication using the common certificate package 117. Here, the connect destination data correspond to an IP address of the auxiliary server 50.

Figure 8:
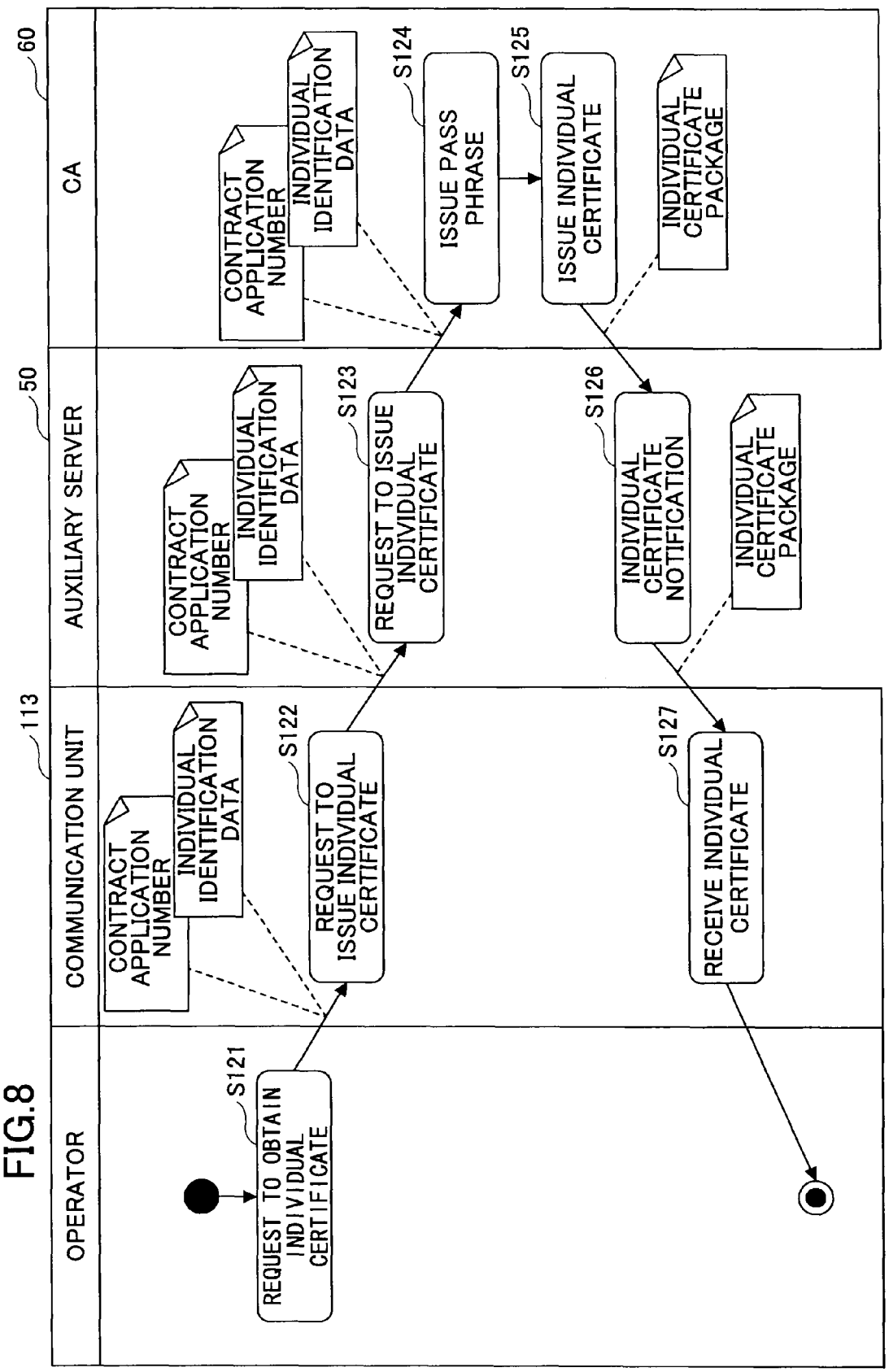
FIG. 8 is a diagram for describing a process to obtain an individual certificate package.

Subsequently, a process to obtain an individual certificate package of each PC 10 is performed by the cryptographic communication using the common certificate package 117. FIG. 8 is a diagram for describing the process for obtaining the individual certificate package.

When the user inputs the contract application number and an instruction to obtain an individual certificate package through a display which the UI unit 112 of the PC 10 displays on the display device 106 (S121), the communication unit 113 sends an issue request of the individual certificate package with the inputted contract application number and the individual identification data of the PC 10 to the auxiliary server 50 (S122). Here, the issue request for the individual certificate package cannot be sent unless authenticated by using the common certificate package 117 and the like. Therefore, the issue request for the individual certificate package can be sent only by the communication unit 113 of the PC 10 with a valid common certificate package 117. A detail of the authentication is described below. Note that the UI unit 112 or the communication unit 113 checks a form of the inputted contract application number, and if the form is not (does not match) a predetermined form, the process to obtain the individual certificate package may be stopped. As a result, the likelihood of the individual certificate package being obtained by a person other than a contractor can be further reduced.

Next, the auxiliary server 50 sends the contract application number and the individual identification data to the CA 60 and requests an issue of an individual certificate package to the CA 60 (S123). Subsequently, the CA 60 issues (generates) a pass phrase for protecting the individual certificate package (S124) based on the individual identification data. Note that the pass phrase may be the individual identification data or individual identification data converted based on a predetermined rule.

Next, the CA 60 generates an individual certificate package which is unique to each PC 10 and returns it to the auxiliary server 50 (S125). Note that the CA 60 records (embeds) the pass phrase in the individual certificate package when generating the individual certificate package. Subsequently, the auxiliary server 50 returns the issued individual certificate package to the communication unit 113 of the PC 10 (S126). The communication unit 113 receives the individual certificate package and stores it in the HDD 102 (S127).

Figure 9:
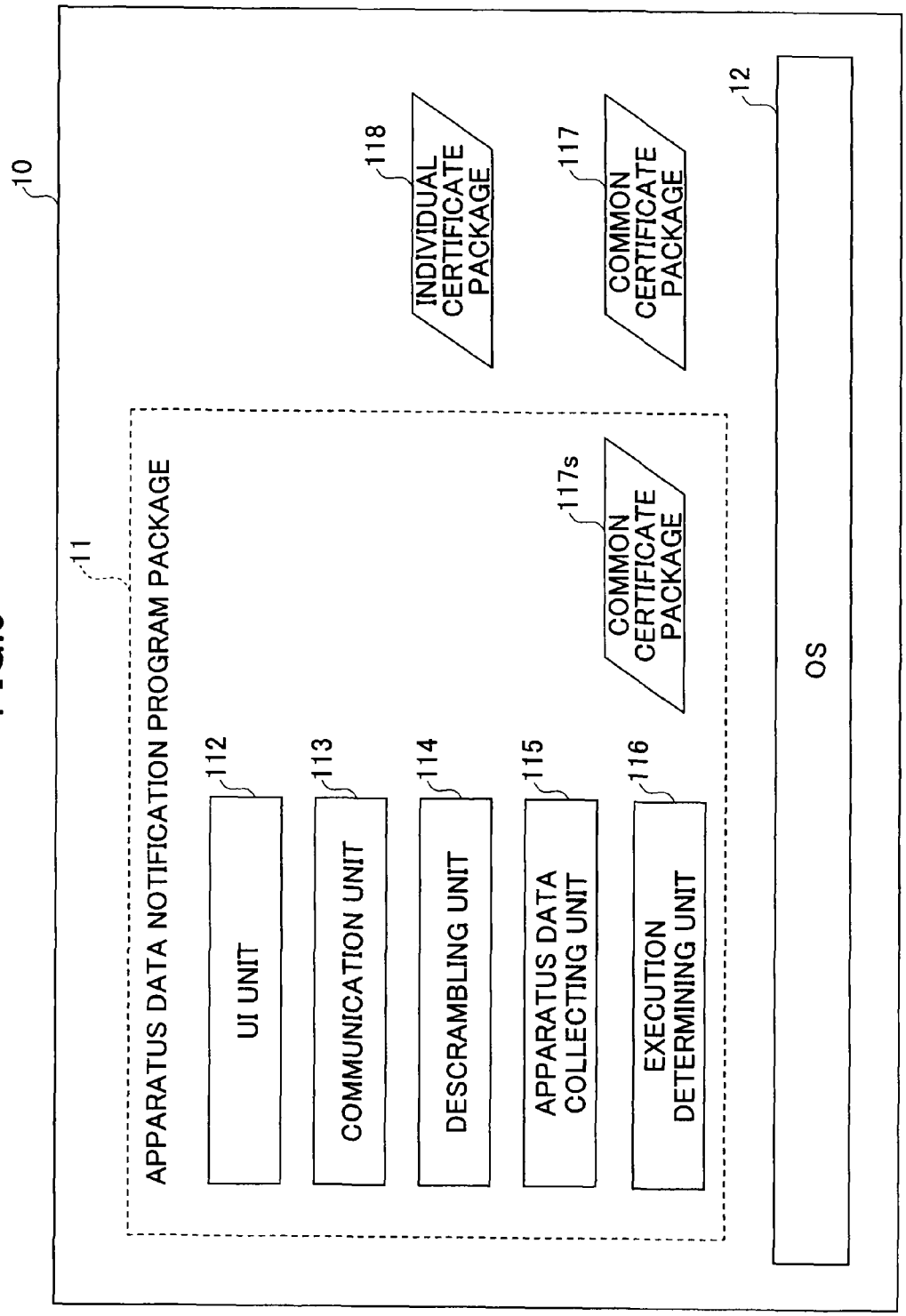
FIG. 9 is a diagram showing a configuration example of functions of a PC after the individual certificate package is introduced.

FIG. 9 is a diagram showing a configuration example of functions of the PC after the individual certificate package is introduced. In FIG. 9, an individual certificate package 118 is included as a new component.

Figure 10:
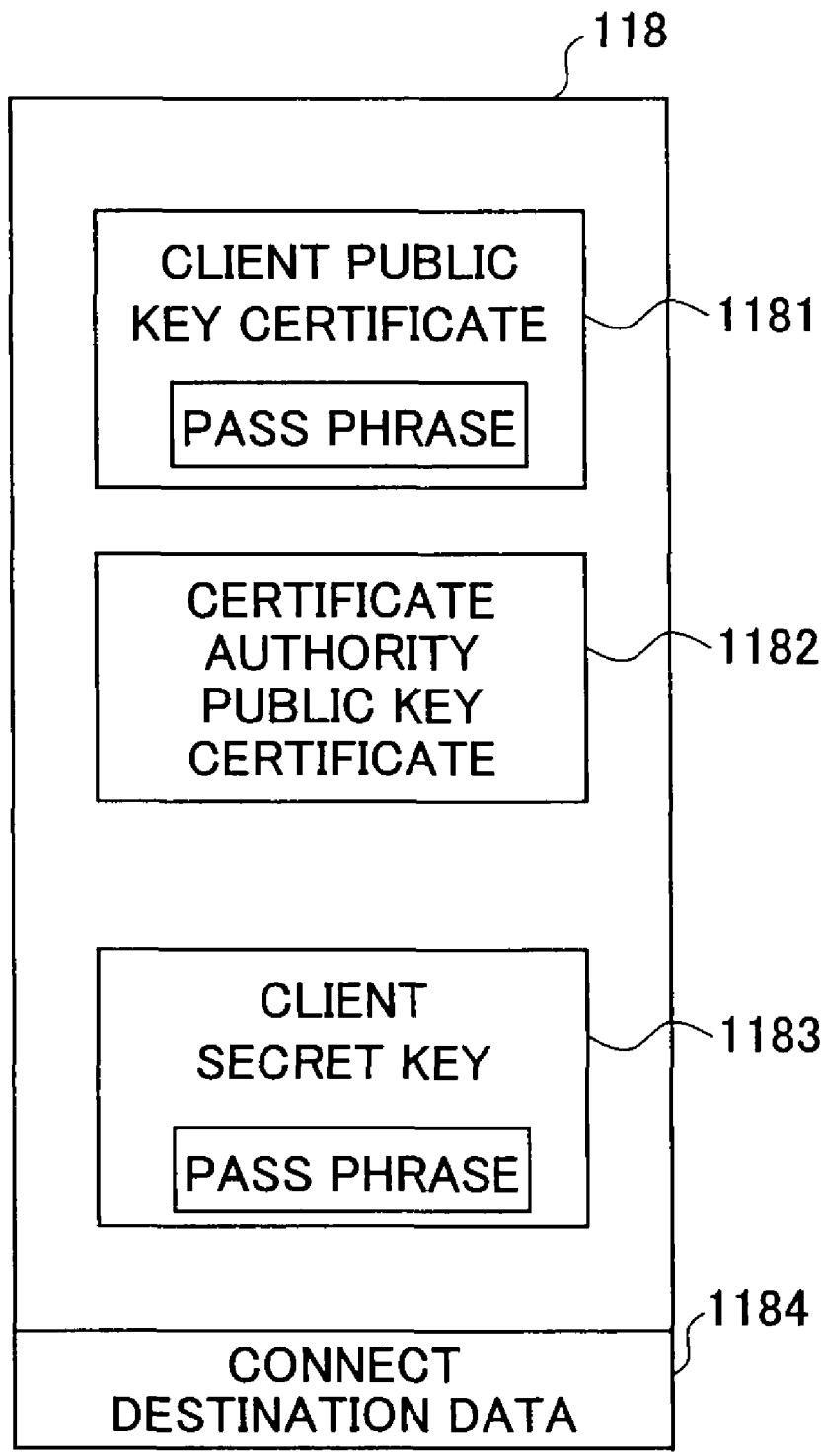
FIG. 10 is a diagram showing a configuration example of the individual certificate package.

FIG. 10 is a diagram showing a configuration example of the individual certificate package. As shown in FIG. 10, the individual certificate package 118 includes a client public key certificate 1181, a certificate authority public key certificate 1182, a client secret key 1183, connect destination data 1184, and the like. The client public key certificate 1181 and the client secret key 1183 are used as a public key certificate and a secret key of the PC 10 side in the cryptographic communications with the center server 40. The certificate authority public key certificate 1182 is a public key certificate of the CA 60. The connect destination data 1184 are identification data of a connect destination by cryptographic communication using the common certificate package 118. Here, the connect destination data 1184 correspond to an IP address of the center server 40. Note that the pass phrase is recorded in or related to at least one of the client public key certificate 1181 and the client secret key 1183.

As described above, since the individual certificate package 118 to communicate with the center server 40 is introduced in the PC 10, the apparatus monitoring service can be used. That is, apparatus data can be sent from the PC 10 to the center server 40.

Figure 11:
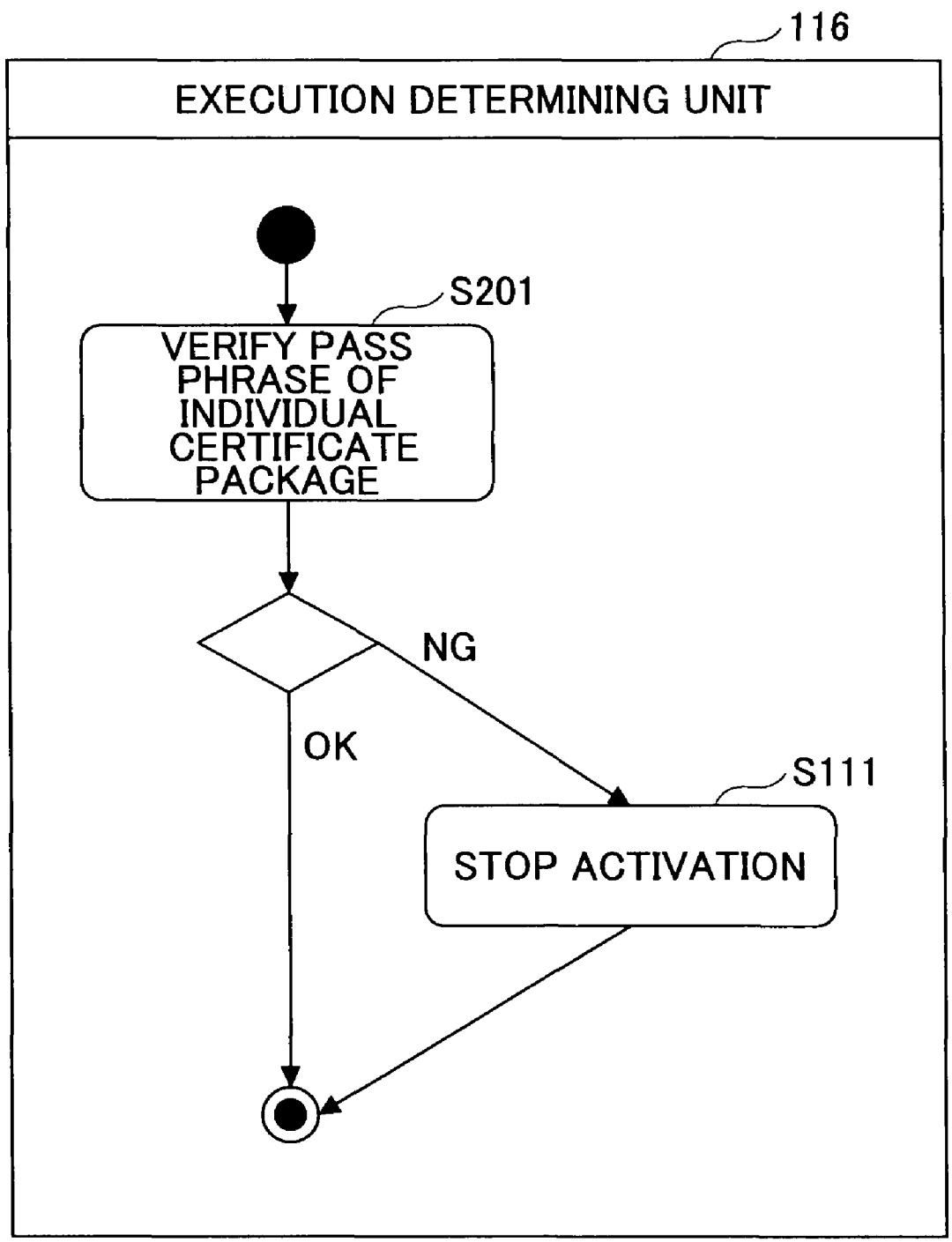
FIG. 11 is a diagram for describing a process order to use an apparatus monitoring service.

A process performed when the apparatus monitoring service is used is described. FIG. 11 is a diagram showing a process order for using the apparatus monitoring service.

For example, when a user gives an instruction to activate the apparatus data notification program when using the apparatus monitoring service, the execution determining unit 116 obtains individual identification data from the PC 10 and conducts verification of the pass phrase related to at least one of the client public key certificate 1181 and the client secret key 1183 of the individual certificate package 118 (S201). Specifically, in the case where the pass phrase is the individual identification data, the execution determining unit 116 compares the individual identification data obtained by the PC 10 with the pass phrase. Further, in the case where the pass phrase is the individual identification data converted based on a predetermined rule, the execution determining unit 116 converts the individual identification data obtained by the PC 10 based on the predetermined rule, and compares the converted value with the pass phrase.

When the individual identification data or the converted individual identification data do not match the pass phrase, the execution determining unit 116 stops the activation of the apparatus data notification program. When the individual identification data or the converted individual identification data match the pass phrase, the execution determining unit 116 does not stop the activation. As a result, the apparatus data notification program is normally activated. Therefore, even when the individual certificate package 118 is copied into another PC, the apparatus data notification program cannot be activated in the PC which has the copied individual certificate package 118.

When the apparatus data notification program is normally activated, apparatus data are collected from each apparatus 20 by the apparatus data collecting unit 115. Then, the apparatus data are sent by the communication unit 113 to the center server 40. When the apparatus data are sent to the center server 40, authentication is performed by using the individual certificate package 118 and the like. Therefore, the apparatus data cannot be sent to the center server 40 unless the PC 10 has a valid individual certificate package 118.

Note that the process shown in FIG. 11 may be performed at a timing other than when activating the apparatus data notification program. This process may be performed any time before the apparatus data are sent to the center server 40.

Figure 12:
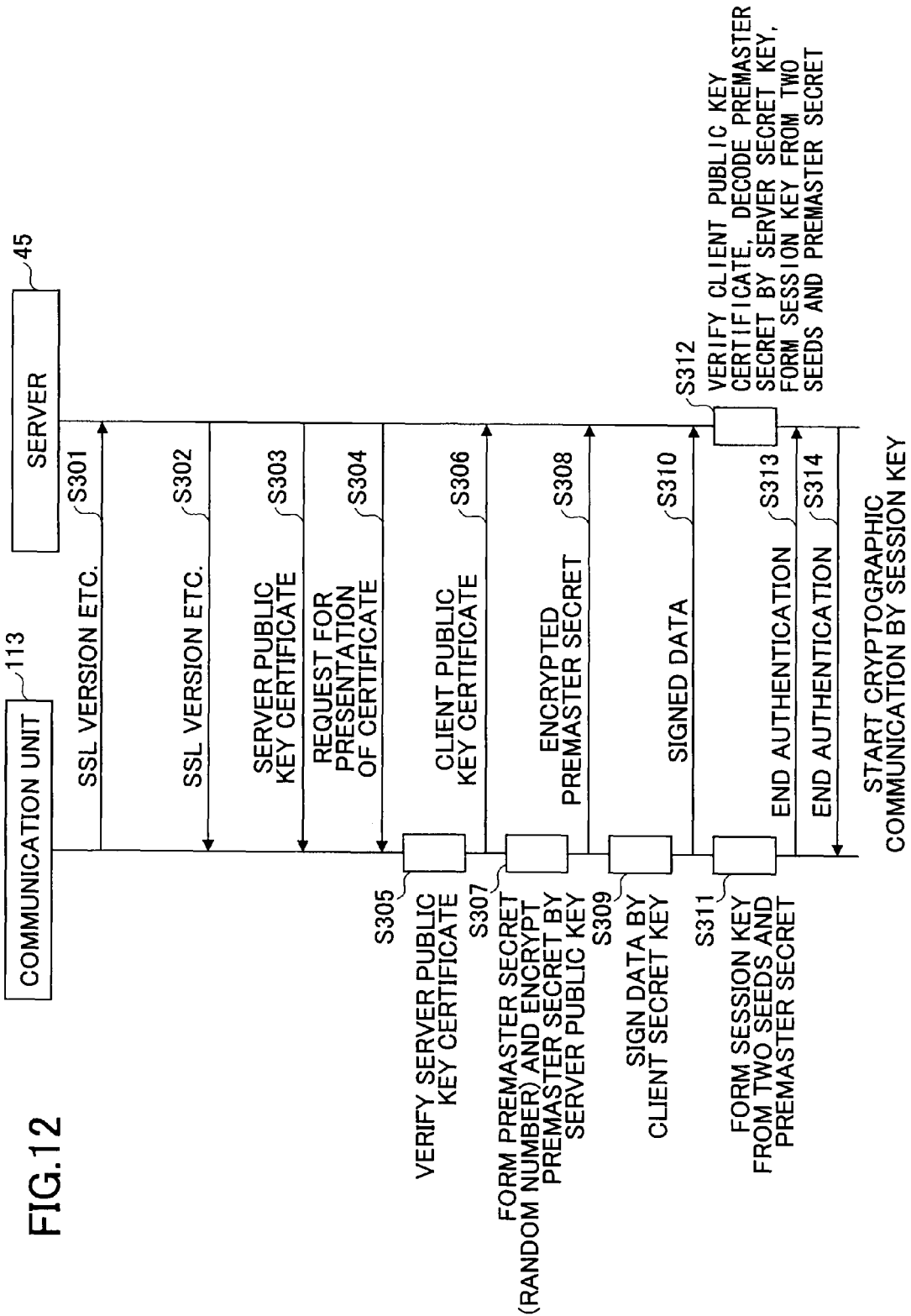
FIG. 12 is a sequence diagram for describing an authentication process by SSL.

Next, an authentication process performed when the communication unit 113 communicates with the auxiliary server 50 or the center server 40 is described. FIG. 12 is a sequence diagram for describing an authentication process by SSL. In FIG. 12, a server 45 indicates the auxiliary server 50 or the center server 40. In this authentication process, it is a premise that a certificate package is introduced in the server 45 as well. That is, in this embodiment, certificate packages which are unique to each of the auxiliary server 50 and the center server 40 are introduced (stored) in advance in the auxiliary server 50 and the center server 40. The certificate package includes a public key certificate (server public key certificate) unique to each server 45, a secret key (server secret key) unique to each server 45, and a public key certificate of the certificate authority 60.

When the communication between the server 45 and the communication unit 113 is started, the communication unit 113 sends an SSL version number, a supported cryptographic set, a random number, and the like to the server 45 (S301). Next, the server 45 sends the SSL version number, a cryptographic set to be used, the random number, and the like to the communication unit 113 (S302). Then, the server 45 sends a server public key certificate to the communication unit 113 (S303). Subsequently, the server 45 sends a request for a presentation of the certificate to the communication unit 113 (S304). Then, the server 45 waits for a response from the communication unit 113.

The communication unit 113, upon receiving the server public key certificate, conducts verification of the server public key certificate by using the certificate authority public key certificate 1182 (S305). When the server public key certificate is validated, the communication unit 113 sends the client public key certificate 1181 to the server 45 (S306). Then, the communication unit 113 encrypts a premaster secret (random number) calculated from a hash value of the data which have been used so far, by using the server public key (S307). Next, the communication unit 113 sends an encrypted premaster secret to the server 45 (S308). Then, by a client secret key, the communication unit 113 signs random number data calculated by using the data which have been used so far (S309). Then, the communication unit 113 sends the signed random number data to the server 45 (S310). Subsequently, the communication unit 113 forms a session key according to two seeds and the premaster secret (S311).

Next, the server 45 conducts verification of the received client public key certificate 1181 by using the certificate authority public key certificate included in the server 45. Further, the server 45 conducts verification of the signed data by using the client public key certificate 1181. Moreover, the server 45 forms a session key according to the premaster secret decoded by the server secret key and the two seeds (S312).

Next, the communication unit 113 sends a message indicating "this common key is hereinafter used to send data" and an SSL authentication complete message to the server 45 (S313). Then, the server sends the message indicating "this common key is hereinafter used to send data" and the SSL authentication complete message to the communication unit 113 (S314). After these processes, cryptographic communications by using the session key are started (S314). By these cryptographic communications, the communication unit 113 sends an issue request of an individual certificate package to the auxiliary server 50 in step S122 in FIG. 8 and sends apparatus data and the like to the center server 40. Therefore, when the valid common certificate package 117 or individual certificate package 118 is not introduced in the PC 10, the process cannot pass the authentication shown in FIG. 4 and communication after this cannot be performed.

If the server 45 is a false server other than a server as an owner of the certificate, the server 45 does not have a secret key. Therefore, the premaster secret sent from the communication unit 113 cannot be decoded. Moreover, if the communication unit 113 is a false client other than an owner of the certificate, a sign by the client cannot be recognized. Therefore, the process shown in FIG. 12 achieves mutual authentication.

As described above, according to the PC 10 of an embodiment of the present invention, security concerning distribution of the individual certificate package 118 and sending of apparatus data can be appropriately ensured in the apparatus monitoring system 1.

By using such an information processing apparatus, security of a remote monitoring system for an apparatus can be appropriately ensured.

According to one embodiment, an information processing apparatus, an information processing method, and a computer readable recording medium can be provided, which can appropriately ensure security of a remote monitoring system for an apparatus.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

This patent application is based on Japanese Priority Patent Application No. 2008-030930 filed on Feb. 12, 2008, the entire contents of which are hereby incorporated herein by reference.

What is claimed is:

1. An information processing system comprising plural information processing apparatuses for collecting apparatus data from a corresponding apparatus connected through a network and sending the apparatus data to a server apparatus connected through the network, each information processing apparatus comprising:
   a recording unit storing a first secret key and a first public key certificate which are encrypted by common key data, the first secret key, the first public key certificate, and the common key data being common to the plural information processing apparatuses;
   a key data obtaining unit configured to obtain, from the information processing apparatus, individual identification data uniquely identifying the information processing apparatus, send a request to provide the common key data through the network to the server apparatus by specifying the individual identification data, and receive the encrypted common key data encrypted by the individual identification data from the server apparatus;
   a decoding unit configured to decode the encrypted common key data by using the individual identification data, and decode the first public key certificate and the first secret key by using the decoded common key data; and
   a certificate obtaining unit for obtaining a second public key certificate and a second secret key, which are unique to the information processing apparatus, by cryptographic communication using the decoded first public key certificate and the decoded first secret key,
   wherein at least one of the second public key certificate and the second secret key includes a pass phrase, and the pass phrase is verified by comparing to the individual identification data, and when the pass phrase is the individual identification data, the individual identification data is compared to the pass phrase, and when the pass phrase is the individual identification data converted based on a predetermined rule, the individual identification data is converted based on the predetermine rule, and the converted individual identification data is compared to the pass phrase.

2. The information processing system as claimed in claim 1, wherein the apparatus data are sent to the server apparatus by cryptographic communication using the second public key certificate and the second secret key.

3. The information processing system as claimed in claim 1, wherein the key data obtaining unit receives request identification data generated to be unique to the encrypted common key data and the request; an input unit by which a user inputs the request identification data is provided; and the certificate obtaining unit does not obtain the second public key certificate and the second secret key when a form of the inputted request identification data does not match a predetermined form.

4. An information processing method executed by plural information processing apparatuses which collect apparatus data from an apparatus connected through a network and send the apparatus data to a server apparatus connected through the network, comprising:
   a key data obtaining step of obtaining individual identification data uniquely identifying the information processing apparatus from the information processing apparatus, sending a request to provide common key data through the network to the server apparatus by specifying the individual identification data, and receiving encrypted common key data which is encrypted by the individual identification data from the server apparatus;
   a decoding step of decoding the encrypted common key data by using the individual identification data, and decoding a first public key certificate and a first secret key stored in a recording unit by using the decoded common key data, the first secret key, the first public key certificate, and the common key data being common to the plural information processing apparatuses; and a certificate obtaining step for obtaining a second public key certificate and a second secret key, which are unique to the information processing apparatus, by cryptographic communication using the decoded first public key certificate and the decoded first secret key, wherein at least one of the second public key certificate and the second secret key includes a pass phrase, and the pass phrase is verified by comparing to the individual identification data, and when the pass phrase is the individual identification data, the individual identification data is compared to the pass phrase, and when the pass phrase is the individual identification data converted based on a predetermined rule, the individual identification data is converted based on the predetermine rule, and the converted individual identification data is compared to the pass phrase.

5. The information processing method as claimed in claim 4, wherein the apparatus data are sent to the server apparatus by cryptographic communication using the second public key certificate and the second secret key.

6. The information processing method as claimed in claim 4, wherein:

the key data obtaining step receives request identification data generated to be unique to the encrypted common key data and the request;

an input step by which a user inputs the request identification data is provided; and the certificate obtaining step does not obtain the second public key certificate and the second secret key when a form of the inputted request identification data does not match a predetermined form.

7. A non-transitory computer readable recording medium recorded with a computer program for causing plural computers to collect apparatus data from an apparatus connected through a network and send the apparatus data to a server apparatus connected to the network, said computer program comprising:

a key data obtaining code for obtaining individual identification data uniquely identifying the computer from the computer, sending a request to provide common key data through the network to the server apparatus by specifying the individual identification data, and receiving encrypted common key data which is encrypted by the individual identification data from the server apparatus;

a decoding code for decoding the encrypted common key data by using the individual identification data, and decoding a first public key certificate and a first secret key in a recording unit of the computer by using the decoded common key data, the first secret key, the first public key certificate, and the common key data being common to the plural computers; and a certificate obtaining code for obtaining a second public key certificate and a second secret key, which are unique to the computer, by cryptographic communication using the decoded first public key certificate and the decoded first secret key, wherein at least one of the second public key certificate and the second secret key includes a pass phrase, and the pass phrase is verified by comparing to the individual identification data, and when the pass phrase is the individual identification data, the individual identification data is compared to the pass phrase, and when the pass phrase is the individual identification data converted based on a predetermined rule, the individual identification data is converted based on the predetermine rule, and the converted individual identification data is compared to the pass phrase.

8. The non-transitory computer readable recording medium as claimed in claim 7, wherein the apparatus data are sent to the server apparatus by cryptographic communication using the second public key certificate and the second secret key.

9. The non-transitory computer readable recording medium as claimed in claim 7, wherein:

the key data obtaining code receives request identification data generated to be unique to the encrypted common key data and the request;

an input code by which a user inputs the request identification data is provided; and the certificate obtaining code does not obtain the second public key certificate and the second secret key when a form of the inputted request identification data does not match a predetermined form.

* * * * *